United States Patent
Nakabuchi

(10) Patent No.: US 7,170,752 B2
(45) Date of Patent: Jan. 30, 2007

(54) NAVIGATION SYSTEM INCORPORATING ANTENNA

(75) Inventor: Masayuki Nakabuchi, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/941,781

(22) Filed: Sep. 15, 2004

(65) Prior Publication Data
US 2005/0057904 A1  Mar. 17, 2005

(30) Foreign Application Priority Data
Sep. 16, 2003 (JP) ............... 2003-322939

(51) Int. Cl.
*H05K 5/00* (2006.01)
*H01Q 1/38* (2006.01)
(52) U.S. Cl. ............... 361/724; 343/700 MS
(58) Field of Classification Search .......... 361/724, 361/752, 730, 736, 748, 749, 764; 343/702, 343/700 MS, 714
See application file for complete search history.

(56) References Cited

U.S. PATENT DOCUMENTS

| | | | |
|---|---|---|---|
| 6,049,314 A | 4/2000 | Munson et al. | 343/646 |
| 6,133,883 A | 10/2000 | Munson et al. | 343/700 MS |
| 6,600,101 B2* | 7/2003 | Mazurkiewicz | 174/35 MS |
| 6,743,975 B2* | 6/2004 | Kolb | 174/35 R |
| 6,849,800 B2* | 2/2005 | Mazurkiewicz | 174/35 MS |
| 6,850,533 B2* | 2/2005 | Gerszberg et al. | 370/401 |
| 6,900,383 B2* | 5/2005 | Babb et al. | 174/35 MS |

FOREIGN PATENT DOCUMENTS

| | | |
|---|---|---|
| JP | 6-237188 | 8/1994 |
| JP | 9-46245 | 2/1997 |

* cited by examiner

*Primary Examiner*—Tuyet Vo
*Assistant Examiner*—Minh Dieu A
(74) *Attorney, Agent, or Firm*—Harness, Dickey & Pierce, PLC

(57) ABSTRACT

A navigation system incorporating an antenna includes a cabinet constructed of electroplated case and cover. An antenna element is integrated to the cabinet and electrically connected with the cover that is a ground of the antenna element. With this configuration, the cabinet and the antenna element can be installed in a vehicle at once and wiring of the antenna element outside the cabinet can be eliminated. Thus, installability of the navigation system is improved in comparison with known devices. Furthermore, the cover is formed such that its surface is larger than that of the antenna element. As a result, directivity of the antenna element is properly secured.

17 Claims, 3 Drawing Sheets

NAVIGATION SYSTEM INCORPORATING ANTENNA

CROSS REFERENCE TO RELATED APPLICATION

This application is based on and incorporates herein by reference Japanese Patent Application No. 2003-322939 filed on Sep. 16, 2003.

FIELD OF THE INVENTION

The present invention relates to a navigation system incorporating an antenna.

BACKGROUND OF THE INVENTION

A receiver incorporating an antenna is proposed in JP-A-6-237188. The antenna is integrated into a cabinet and therefore wiring of the antenna outside the cabinet can be eliminated. Installability of the antenna is improved by providing the antenna and the cabinet as a unit and eliminating the wiring outside the cabinet.

In this receiver, the antenna is provided as a flat antenna printed on a printed circuit board. Thus, an area occupied by the antenna is large, which makes difficult to reduce the size of the receiver. Moreover, a ground having a larger area than the antenna is required for securing proper directivity. However, such a ground is not provided in the receiver and proper directivity is not secured.

SUMMARY OF THE INVENTION

The present invention therefore has an objective to provide a navigation system incorporating an antenna, directivity of which is properly secured, with improved installability. A navigation system of the present invention includes an antenna element integrated to a cabinet, a part of which is made of metal and finished to function as a ground of the antenna element. Since the antenna is integrated to the cabinet, wiring of the antenna can be arranged inside the cabinet. Namely, wiring of the antenna outside the cabinet can be eliminated and therefore the navigation system is easily installed in a vehicle.

Furthermore, a part of the cabinet functions as a ground of the antenna element, that is, the directivity of the antenna is properly secured without an additional ground member. As a result, the directivity of the antenna is properly secured while the installability of the navigation system is maintained.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
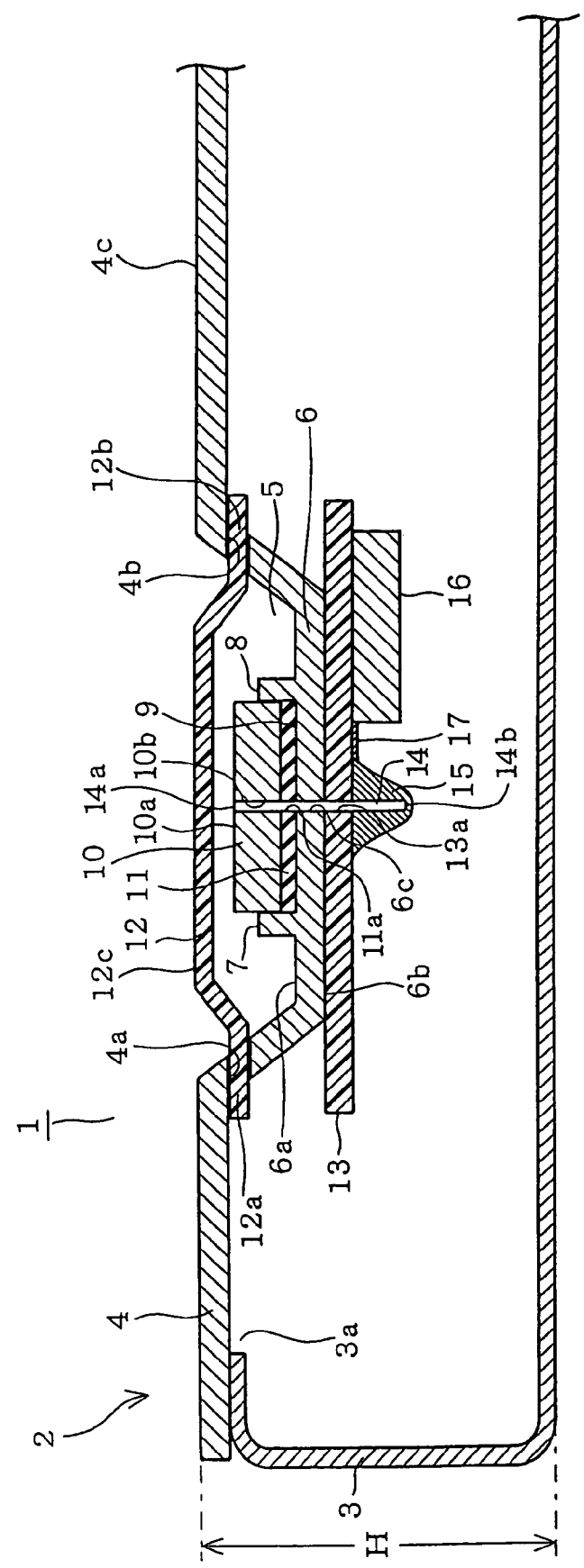
FIG. 1 is a partial sectional view of a navigation system according to the first embodiment of the present invention.

The preferred embodiments of the present invention will be explained with reference to the accompanying drawings. In the drawings, the same numerals are used for the same components and devices.

[First Embodiment]

Referring to FIG. 1, a navigation system 1 incorporating an antenna includes a cabinet 2. The cabinet 2 is constructed of a case 3 and a cover 4, both made of metal and electroplated, and its overall shape is a substantially rectangular box. The case 3 is formed in an open-top box shape with an opening 3a that is closed with the cover 4 after a printed circuit board (PCB) and other electronic parts are placed in the case 3. A height H of the cabinet 2 is slightly smaller than an inside height of a Deutsche Industrie-Norm (DIN) slot so that the cabinet 2 is fit in the DIN slot.

The cover 4 has a recess 5 in a predetermined area for holding an antenna element 10. An antenna element mounting portion 9 is formed by ribs 7, 8 on a top surface 6a of a bottom 6 of the recess 5. The antenna element 10 is formed substantially in a rectangular or square box shape and fixed to the antenna element mounting portion 9 via a double-faced tape 11. It receives GPS signals transmitted from a GPS satellite. The cover 4 is formed such that its surface area is larger than that of the antenna element 10 and electrically connected with the antenna element 10. The cover 4 is a ground of the antenna element 10.

A resin radome 12 is attached to the cover 4 by inserting nails 12a, 12b to holes 4a, 4b of the cover 4 for covering the recess 5 with a snap-in structure. The radome 12 is positioned such that its top surface 12c is substantially on the same plane with the top surface 4c of the cover 4. The antenna element 10 is arranged in the recess 5 such that a top surface 10a of the antenna element 10 is at a position lower than a top surface 4c of the cover 4. Namely, the antenna element 10 is placed in a closed space defined by the recess 5 and with the radome 12 and protected. The resin radome 12 also adds an aesthetically pleasing appearance to the antenna.

A printed circuit board (PCB) 13 is fixed to a bottom surface 6b of the bottom 6 of the recess 5 in the cabinet 2. A power supply pin 14 is passed through an antenna element hole 10b, a tape hole 11a, a bottom hole 6c, and a PCB hole 13a. The antenna element hole 10b, the tape hole 11, the bottom hole 6c, and the PCB hole 13a are formed in the antenna element 10, the double-faced tape 11, the bottom 6 of the recess 5, and the PCB 13, respectively. The power supply pin 14 has the first end 14a and the second end 14b. The power supply pin 14 is arranged so that the tip of the first end 14a is aligned with the top surface 10a of the antenna element 10. The second end 14b is connected to the PCB 13 with solder 15.

A high-frequency IC 16 is mounted on the PCB 13 at a predetermined position and electrically connected with the antenna element 10 via the power supply pin 14, the solder 15 and a wiring pattern 17. The IC 16 amplifies the high frequency GPS signals inputted via the antenna element 10, and produces low frequency intermediate signals by converting a high frequency of 1575 MHz to a low frequency of 4 MHz.

In the navigation system 1, the antenna element 10 is integrated to the cabinet 2 and therefore the cabinet 2 and the antenna element 10 can be installed in a vehicle at once. Namely, the navigation system 1 is easier to install in a vehicle in comparison with navigation systems that require separate installation for an antenna and a cabinet. Moreover, wiring of the antenna element 10 can be arranged inside the cabinet 2, that is, wiring of the antenna element 10 outside the cabinet 2 is eliminated. As a result, the installability of the navigation system 1 is further improved.

Furthermore, the electroplated cover 4 is formed as a ground of the antenna element 10 such that its surface is larger than that of the antenna element 10. Thus, directivity of the antenna is properly secured without an additional ground member and while the installability of the navigation system 1 is maintained.

Since the antenna element 10 is arranged outside the cabinet 2, it can be seen without disassembling the cabinet 2 into the case 3 and the cover 4. If product information, including a product number and a specification, is indicated on the top surface 10a of the antenna element 10, the product information is easily recognized only by removing the radome 12 from the cover 4.

The antenna element 10 is placed in the recess 5 such that the top surface 10a of the antenna element 10 is situated at a position lower than the top surface 4a of the cover 4. As a result, the antenna element 10 does not protrude from the top surface of the cabinet 2 and the overall shape of the system can be formed substantially in a rectangular box. This rectangular box shape makes the navigation system 1 easier to be fit in the DIN slot.

The PCB 13 is arranged inside the cabinet 2 directly below the antenna element 10 on the same side as which the antenna element 10 is arranged. For instance, the antenna element 10 and the PCB 13 are arranged in an upper space of the cabinet 2 as shown in FIG. 1. Moreover, the antenna element 10 is electrically connected with the high-frequency IC 16 via the power supply pin 14. An expensive coaxial cable is not required for connecting the antenna element 10 with the high-frequency IC 16 within the cabinet 2. Thus, the number of parts, the number of man-hours, and the production cost are reduced.

[Second Embodiment]

Figure 2:
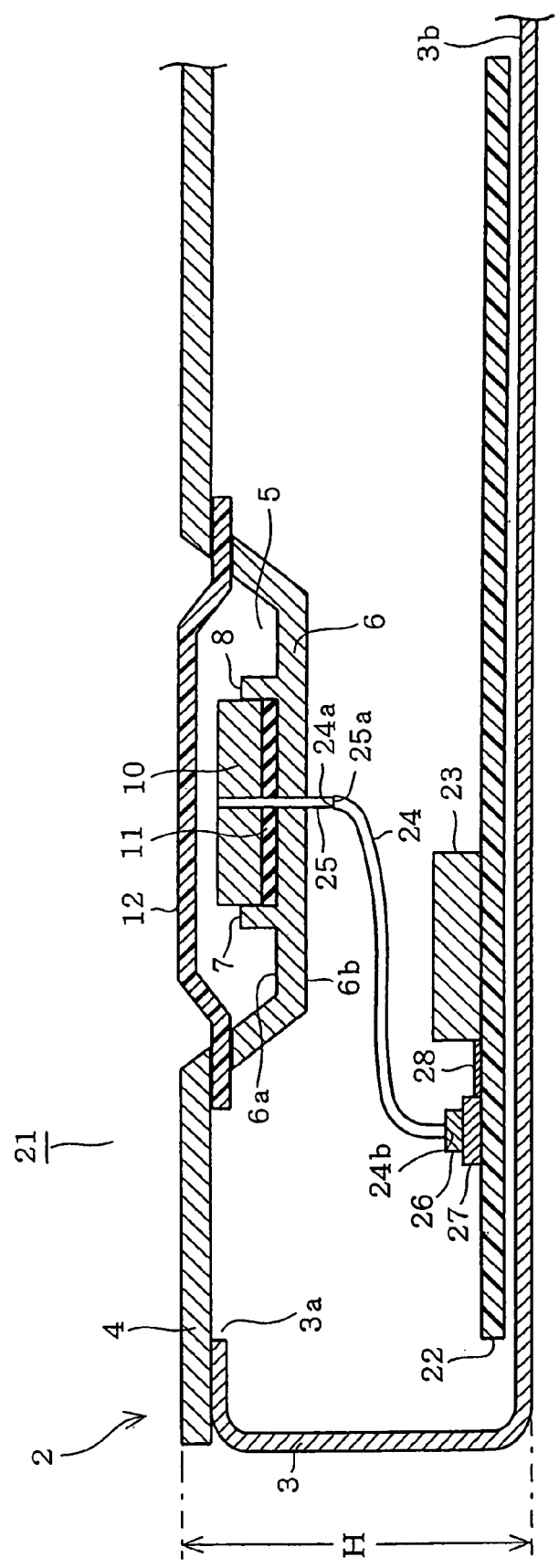
FIG. 2 is a partial sectional view of a navigation system according to the second embodiment of the present invention.

Referring to FIG. 2, a navigation system 21 includes a PCB 22 arranged along a bottom 3a of the case 3 inside the cabinet 2. In FIG. 2, parts indicated with the same numerals as the first embodiment shown in FIG. 1 are the same parts in the first embodiment. Therefore, detailed descriptions for those parts will not be provided here. A high-frequency IC 23 having the same function with the high-frequency IC 16 of the first embodiment is mounted on the PCB 22 at a predetermined position. The first end 24a of a coaxial cable 24 is connected with the first end 25a of a power supply pin 25 and the second end 24b of the coaxial cable 24 is connected with a connector 26. A connector 27 is connected with the connector 26 and the PCB 22. As a result, the antenna element 10 is electrically connected with the high-frequency IC 23 via the power supply pin 25, the coaxial cable 24, the connectors 26, 27, and a wiring pattern 28 on the PCB 22.

In the navigation system 21, the antenna element 10 is integrated to the cabinet 2. Therefore, the navigation system 21 is easier to install in a vehicle in comparison with navigation systems that require separate installation for an antenna element and a cabinet. Furthermore, the electroplated cover 4 is formed as a ground of the antenna element 10 such that its surface is larger than that of the antenna element 10. Thus, directivity of the antenna is properly secured without an additional ground member and while the installability of the navigation system 21 is maintained.

The PCB 22 is arranged inside the cabinet 2 on the opposite side to the side on which the antenna element 10 is arranged. For instance, the antenna element 10 and the PCB 22 are arranged in an upper space and a lower space of the cabinet 2, respectively, as shown in FIG. 2. The PCB 22 is electrically connected with the high-frequency IC 23 via the conductive wire 24. Namely, the PCB 22 is arranged in a way that a PCB is normally arranged in known devices. Therefore, remarkable alterations to arrangements of parts are not necessary. With this configuration, a slot (not shown) for a memory device, such as a DVD, can be provided above the PCB 22.

[Third Embodiment]

Figure 3:
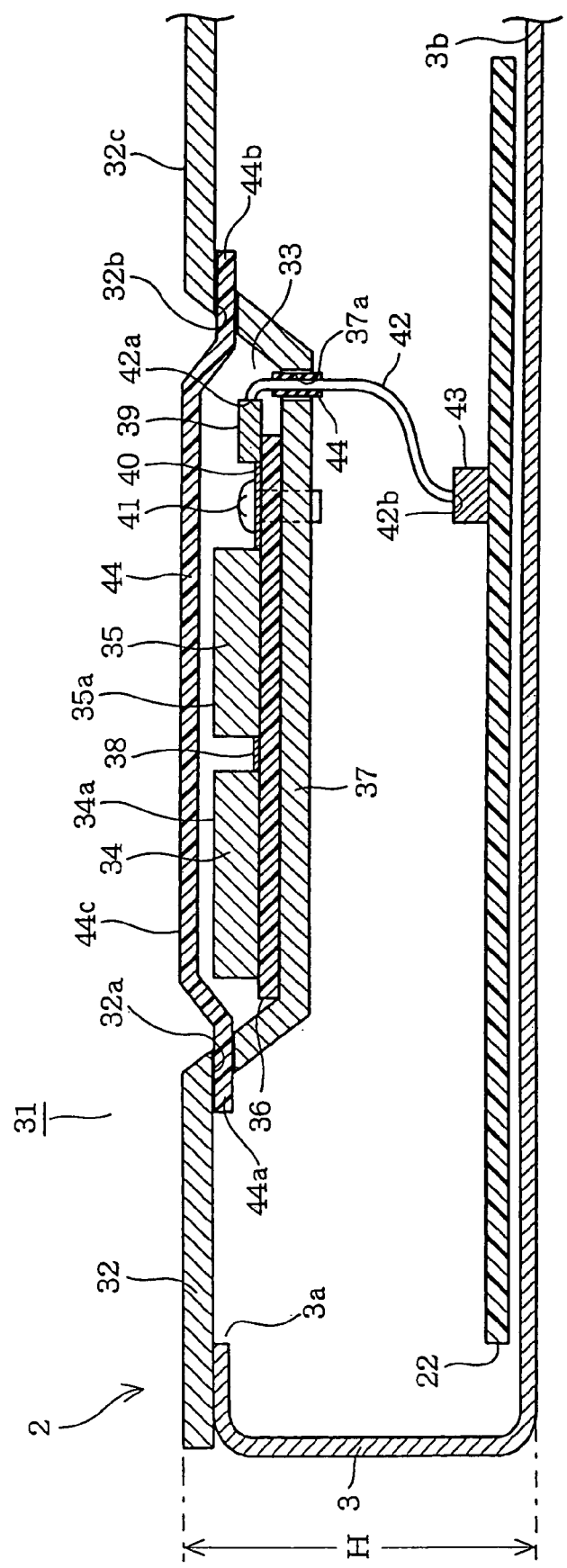
FIG. 3 is a partial sectional view of a navigation system according to the third embodiment of the present invention.

Referring to FIG. 3, a navigation system 31 includes a high-frequency IC 35 arranged adjacent to the antenna element 10. In FIG. 3, parts indicated with the same numerals as the first embodiment shown in FIG. 1 are the same parts in the second embodiment. Therefore, detailed descriptions for those parts will not be provided here.

In a navigation system 31 incorporating an antenna, a cover 32 has a recess 33, a bottom area of which is larger than that of the recess 5 provided in the cover 4 of the first or the second embodiment. The cover 32 is made of metal and electroplated and formed such that its surface area is larger than that of an antenna element 34 and electrically connected with the antenna element 34. The cover 32 is a ground of the antenna element 34. The antenna element 34 is a surface mount-type element and mounted on a sub PCB 36.

A high-frequency IC 35 having the same function as the high-frequency IC 23 of the second embodiment is also mounted on the sub PCB 36. The sub PCB 36 is fixed to a bottom portion 37 of the recess 33 with a screw 41 and the antenna element 34 and the high-frequency IC 35 are arranged in the recess 33. The antenna element 34 is electrically connected with the high-frequency IC 35 via a wiring pattern 38 and the high-frequency IC 35 is electrically connected with the connector 39 via a wiring pattern 40.

The PCB 22 is arranged in the cabinet 2 along the bottom 3b of the case 3. The PCB 22 is electrically connected with the high-frequency IC 35 via the sub PCB 36, connectors 39, 43, the wiring pattern 40, a conductive wire 42, for instance, a wire harness. The first end 42a and the second end 42b of the conductive wire 42 are connected with the connector 39 mounted on the sub PCB 36 and the connector 43 mounted on the PCB 22, respectively. Therefore, the wiring pattern 40, the connectors 39, 43, and the conductive wire 42 are electrically connected to each other. The conductive wire 42 is passed through a bottom hole 37a formed in the bottom 37 of the recess 33. To protect the conductive wire 42 from a break, which causes an electrical short, an insulating member 44, such as a tape, is provided around the conductive wire 42 in the bottom hole 37a.

A resin radome 33 is attached to the cover 32 by inserting nails 44a, 44b to holes 32a, 32b of the cover 32 for covering the recess 33 with a snap-in structure. The radome 44 is positioned such that its top surface 44c is substantially on the same plane with the top surface 32c of the cover 32. The antenna element 34 and the high-frequency IC 35 are arranged in the recess 33 such that the top surfaces 34a, 35a of the antenna element 34 and the high-frequency IC 35 are situated at positions lower than the top surface 32c of the cover 32. Namely, the antenna element 10 and the high-frequency IC 35 are placed in a closed space defined by the recess 33 and the radome 44, and protected. The radome 44 also adds an aesthetically pleasing appearance to the antenna.

Since the antenna element 34 is integrated to the cabinet 2, the navigation system 31 is easier to install in a vehicle in comparison with navigation systems that require separate installation for an antenna element and a cabinet. Moreover, the electroplated cover 32 is formed as a ground of the antenna element 34 such that its surface is larger than that of the antenna element 34. Thus, directivity of the antenna is properly secured without an additional ground member and while the installability of the navigation system 31 is maintained.

The antenna element 34 and the high-frequency IC 35 are mounted on the sub PCB 36. The PCB 22 is arranged inside the cabinet 2 on the opposite side to the side on which the antenna element 34 is arranged, and electrically connected with the high-frequency IC 35 via the conductive wire 42. For instance, the antenna element 34 and the PCB 22 are arranged in an upper space and a lower space of the cabinet 2, respectively, as shown in FIG. 3. Namely, the PCB 22 is arranged in a way that a PCB is normally arranged in known devices. Therefore, remarkable alterations to arrangements of parts from the known devices are not necessary.

Furthermore, a coaxial cable is not required for connecting the antenna element 34 with the high-frequency IC 35 in this configuration. Since the conductive wire 42 is used for transmitting low-frequency intermediate signals, the signals are less affected by noise and proper noise reduction is presented.

The present invention should not be limited to the embodiment previously discussed and shown in the figures, but may be implemented in various ways without departing from the spirit of the invention. For example, the antenna element 10, 34 can be an antenna for receiving signals from a vehicle information system. The cabinet 2 may be made of resin and a metal plate may be separately provided as a ground of the antenna element 10, 34.

What is claimed is:

1. A navigation system incorporating an antenna comprising:
    a first printed circuit board;
    a cabinet for housing the first printed circuit board at an inside; and
    an antenna element integrated to the cabinet, wherein the cabinet has a metal portion at least in part, and the metal portion is a ground of the antenna element,
 wherein:
    the antenna element is arranged outside the cabinet;
    the cabinet has a recess recessed to the inside of the cabinet for holding the antenna element; and
    the recess holds the antenna element such that a top surface of the antenna element is situated at a position lower than a top surface of the cabinet.

2. The navigation system according to claim 1, wherein the antenna element is formed substantially in a rectangular box shape.

3. The navigation system according to claim 1, wherein:
    the cabinet further includes a casing connected with the metal portion to form an inner space; and
    the printed circuit board is located within the inner space.

4. The navigation system according to claim 1, wherein:
    the cabinet has therein an inner space; and
    the printed circuit board is located within the inner space.

5. The navigation system according to claim 1, wherein the metal portion properly secures directivity of the antenna element.

6. The navigation system according to claim 1, further comprising a high-frequency integrated circuit that converts a high-frequency wave signal to a low frequency intermediate signal, wherein:
    the high-frequency integrated circuit is mounted on the printed circuit board;
    the printed circuit board is arranged inside the cabinet directly below the antenna element and on a same side of the cabinet as which the antenna element is arranged;
    the antenna element is electrically connected with the high-frequency integrated circuit via a power supply pin inside the cabinet;
    the printed circuit board directly contacts a bottom surface of a wall part of the cabinet, defining a bottom of the recess; and
    the power supply pin penetrates through the wall part to be connected to the printed circuit board.

7. The navigation system according to claim 6, further comprising:
    a rib for holding the antenna element, wherein the rib is formed integrally with a wall part of the recess.

8. The navigation system according to claim 1, further comprising:
    a rib for holding the antenna element, wherein the rib is formed integrally with a wall part of the recess.

9. A navigation system incorporating an antenna comprising:
    a first printed circuit board;
    a cabinet for housing the first printed circuit board;
    an antenna element integrated to the cabinet, wherein the cabinet has a metal portion at least in part, and the metal portion is a ground of the antenna element; and
    a high-frequency integrated circuit that converts a high-frequency wave signal to a low-frequency intermediate signal, wherein:
    the high-frequency integrated circuit is mounted on the first printed circuit board;
    the first printed circuit board is arranged inside the cabinet directly below the antenna element and on a same side of the cabinet as which the antenna element is arranged; and
    the antenna element is electrically connected with the high-frequency integrated circuit via a power supply pin inside the cabinet.

10. A navigation system incorporating an antenna comprising:
    a first printed circuit board;
    a cabinet for housing the first printed circuit board;
    an antenna element integrated to the cabinet, wherein the cabinet has a metal portion at least in part, and the metal portion is a ground of the antenna element; and
    a high-frequency integrated circuit that converts a high-frequency wave signal to a low-frequency intermediate signal, wherein:
    the high-frequency integrated circuit is mounted on the first printed circuit board;
    the first printed circuit board is arranged inside the cabinet on an opposite side to a side on which the antenna element is arranged; and
    the antenna element is electrically connected with the high-frequency integrated circuit via a coaxial cable inside the cabinet.

11. A navigation system incorporating an antenna comprising:
    a first printed circuit board;
    a cabinet for housing the first printed circuit board;

an antenna element integrated to the cabinet, wherein the cabinet has a metal portion at least in part, and the metal portion is a ground of the antenna element a second printed circuit board; and a high-frequency integrated circuit that converts a wave signal having a high frequency to an intermediate signal having a low frequency, wherein the high-frequency integrated circuit is mounted on the second printed circuit board;

the second printed circuit board is arranged inside the cabinet on an opposite side to a side on which the antenna element is mounted, and the high-frequency integrated circuit is electrically connected with the second printed circuit board via a conductive wire inside the cabinet.

12. A navigation system incorporating an antenna comprising:

a first printed circuit board;

a cabinet for housing the first printed circuit board; and an antenna element integrated to the cabinet, wherein the cabinet has a metal portion at least in part, and the metal portion is a ground of the antenna element, wherein the cabinet is constructed of a case having an opening and a cover for closing the opening;

the case is formed in a shape such that the first printed circuit board is arranged therein;

the cover is made of metal and electroplated, representing the metal portion of the cabinet;

the cover is formed such that a surface area thereof is larger than that of the antenna element; and the antenna element is electrically connected with the cover.

13. The navigation system according to claim 12, wherein:

the cover has a recess; and the recess holds the antenna element such that a top surface of the antenna element is situated at a position lower than a top surface of the cabinet.

14. The navigation system according to claim 13, wherein:

the cabinet has a shape of a rectangular box to fit in a Deutsche Industrie-Norm slot in a vehicle; and the antenna element has a shape of a rectangular box including a square box.

15. The navigation system according to claim 13, further comprising a resin radome for covering the recess.

16. The navigation system according to claim 12, further comprising a high-frequency integrated circuit that converts a high-frequency wave signal to a low-frequency intermediate signal, wherein the antenna element is electrically connected with the high-frequency integrated circuit via a connecting member inside the cabinet.

17. The navigation system according to claim 16, the connecting member is any one of a power supply pin, a coaxial cable, and a conductive wire.

* * * * *